(12) United States Patent
Beaucoup et al.

(10) Patent No.: US 7,630,502 B2
(45) Date of Patent: Dec. 8, 2009

(54) METHOD FOR OPTIMAL MICROPHONE ARRAY DESIGN UNDER UNIFORM ACOUSTIC COUPLING CONSTRAINTS

(75) Inventors: Franck Beaucoup, Dunrobin (CA); Michael Tetelbaum, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 804 days.

(21) Appl. No.: 10/941,961

(22) Filed: Sep. 16, 2004

(65) Prior Publication Data

US 2005/0232441 A1     Oct. 20, 2005

(30) Foreign Application Priority Data

Sep. 16, 2003    (GB)    ................. 0321722.1

(51) Int. Cl.
  *H04R 3/00*    (2006.01)
(52) U.S. Cl. .................. 381/92; 381/94.1; 381/122
(58) Field of Classification Search ............... 381/71.1, 381/77, 92, 66, 94.1–94.3, 122, 91; 379/406.01–406.14, 379/202–301
See application file for complete search history.

(56) References Cited

U.S. PATENT DOCUMENTS

| 5,532,700 | A  | * | 7/1996 | Lockwood | .................. | 342/378 |
| 7,409,068 | B2 | * | 8/2008 | Ryan et al. | .................. | 381/313 |
| 2003/0105540 | A1 | | 6/2003 | Debail | | |
| 2003/0138116 | A1 | * | 7/2003 | Jones et al. | ................. | 381/94.1 |

FOREIGN PATENT DOCUMENTS

CA    2413217    5/2004

OTHER PUBLICATIONS

Saka et al "Pattern Optimization of a Reflector Antenna with Planar-Array Feeds and Cluster Feeds" IEEE Transactions on Antennas and Propagation, vol. 45, No. 1, Jan. 1997.*
Van Veen et al, "Beamforming: A versatile Approach to Spatial Filtering" IEEE ASSP Magazine Apr. 1988.*
Lu et al "Adaptive Beamforming for Coherent Interference Suppression" IEEE International Conference on Acoustics, Speech and Signal Processing, 1993.*
Jie et al. "The Adaptive Algorithms of the Smart Antenna System in 3G Wireless Communication Systems" 6th International Conference on Signal Processing, 2002.*

(Continued)

*Primary Examiner*—Vivian Chin
*Assistant Examiner*—Fatimat O Olaniran

(57) ABSTRACT

A method of designing a beamformer, and a beamformer made in accordance with this method, characterized by a uniform speakerphone response condition, resulting in optimal beamforming directivity under a uniform coupling constraint. According to the present invention, a finite number of individual beamformers are constrained to have the same response to a loudspeaker signal (as well as the same gain in their respective look directions) without specifying the exact value of their response to this signal. This results in beamformer weights that are optimal in the minimum variance sense and satisfy the uniform coupling constraint. The minimum variance condition combines all beamformer weights at once, and the uniform coupling constraint is expressed as a finite number of linear constraints on the weights of the individual beamformers, without specifying an arbitrary, a priori value for the actual value of the uniform response.

2 Claims, 4 Drawing Sheets

OTHER PUBLICATIONS

Saka et al "Pattern Optimization of a Reflector Antenna with Planar-Array Feeds and Cluster Feeds" IEEE Transactions on Antennas and Propagation, vol. 45, No. 1, Jan. 1997.*

Author: Ryan, James Title: "Near Field Beamforming for Microphone Arrays" IEEE 1997.*

Author:Van Venn, Barry et al Title: Beamforming: A Versatile Approach to Spatial Filtering IEEE ASSP Magazine Apr. 1988.*

Author: Beaucoup, Frank Title: Parallel Beamformer Design Under Response Equaliztion Constraints IEEE 2004.*

Author: Saka, Birsen Title: Pattern Optimization of a Reflector Antenna with Planar-Array Feeds and Cluster Feeds IEEE 1997.*

Llieda, et al., "Robust continuous speech recognition system based on a microphone array", Proceedings of the 1998 IEEE Conference on Acoustics, Speech and Signal Processing, vol. 1, pp. 241-244.

Van Veen and Roberts, "A framework for beamforming structures", IEEE Transactions of Acoustics, Speech and Signal Processing, vol. ASSP-35, No. 4, pp. 584-586, 1987.

Biguesh, et al., Proceedings of 10th IEEE workshop on statistical signal and array processing, pp. 444-447, 2000, "A new beamforming algorithm based on signal subspace eigenvectors".

Ryan, J.G. et al., Near-field beamforming for microphone arrays; 1997 IEEE International Conference on Acoustics, Speach, and Signal Processing; Apr. 1997, pp. 363-366 vol. 1.

EU Search Report, Apr. 6, 2009, Beaucoup, Franck.

Ryan, J.G. et al., Near-field beamforming for microphone arrays; 1997 IEEE International Conference on Acoustics, Speach, and Signal Processing; Apr. 1997 pp. 363-366 vol. 1.

Fischer et al., Beamforming microphone arrays for speech acquisition in noisy environments; Speech Communication, Elsevier Science Publishers, Dec. 1, 1996 pp. 215-227; vol. 20 No. 3-4.

Van Veen B D et al., Beamforming: A Versatile Approach to Spatial Filtering; IEEE ASSP Magazine; Apr. 1988 pp. 4-24 vol. 5 No. 2.

* cited by examiner

METHOD FOR OPTIMAL MICROPHONE ARRAY DESIGN UNDER UNIFORM ACOUSTIC COUPLING CONSTRAINTS

BACKGROUND OF THE INVENTION

1. Field of the Invention

The present invention is directed to audio conferencing systems, and more particularly to a method of beamformer design that equalizes the amount of acoustic coupling among a finite number of beams covering a desired spatial span while preserving directivity characteristics.

2. Description of the Related Art

Spatial directivity in audio conferencing systems can be achieved either through directional microphones or through proper combination of several omni-directional microphones (referred to as microphone array technology).

Beamforming may be used in a microphone array to discriminate a source position in a "noisy" environment by "weighting" or modifying the gain of the signal from each microphone to create a beam in a desired "look" direction toward the source (i.e. talker).

For full-duplex operation, acoustic echo cancellation must be performed to prevent reverberation, howling, etc. (see M. Branstein and D. Ward, "Microphone Arrays. Signal Processing Techniques and Applications". Springer Verlag, 2001, and H. Buchner, W. Herbordt, W. Kellermann, "An Efficient Combination of Multi-Channel Acoustic Echo Cancellation With a Beamforming Microphone Array", Proc. Int. Workshop on Hands-Free Speech Communication (HSC), pp. 55-58, Kyoto, Japan, April, 2001). One approach is to perform acoustic echo cancellation on all the microphone signals in parallel, which is computationally intensive. A second approach is to perform acoustic echo cancellation on the spatially filtered signal at the output of the beamformer (i.e. the output signal of the particular microphone facing the "look direction" at any given point in time).

The challenge that this second approach presents to acoustic echo cancellation is accommodating variations in the characteristics of the directional signal that vary with the spatial area that the system is pointing to. For example, the acoustic echo-path as well as the room characteristics (background noise, etc) may change suddenly as the system changes its look direction, for instance when switching to a different talker. As a result, the acoustic echo cancellation algorithm re-converges to the new characteristics (for instance new echo path) each time the system changes its look direction. These transitions result in under-performance of the system in terms of acoustic echo cancellation.

When a microphone array is disposed within a physically asymmetrical enclosure, variations in the acoustic echo path for different "look" directions can be so significant that the acoustic echo canceller cannot provide reasonable performance without special design enhancements to trace such sudden echo path variations.

One method has been proposed in Canadian Patent Application No. 2,413,217 to deal with the effects of the problem set forth above by saving to (and retrieving from) memory the information that characterizes each of a finite number of look directions, or regions of focus, that cover the entire spatial span of the system. Each time a change in the look direction occurs, the system saves the workspace with essential acoustic characteristics captured by the full-duplex acoustic echo cancellation algorithm in the current sector. It also retrieves from memory the corresponding workspace for each new region of focus (captured the last time the sector as used). The acoustic echo cancellation then takes place for the new region of focus with the retrieved information.

This method reduces negative effects on echo cancellation due to variations in the acoustic echo path and room characteristics when the beams are switching from one look direction to other. However, even with this approach it is desirable that the various beamformers covering the whole angular span of the product present similar characteristics in terms of echo cancellation. Fewer differences between the beamformers, results in a more precise estimation of the acoustic signal characteristics (thereby improving the quality of echo cancellation) and less information being required to reside in the workspaces saved to and retrieved from memory (thereby resulting in code and data memory savings).

One method to reduce the variations in the acoustic characteristics for the different sectors is to design the beamformers such that all sectors have the same response to the direct path and main energy component of the acoustic coupling; that is, the loudspeaker signal. This can be achieved through proper beamformer design. Techniques are known for designing beamformers under desired response constraints whereby a linear constraint is imposed to provide the same value of the response to the loudspeaker signal for all beamformers (i.e. all combinations of beamformer weights applied to the microphone signals). For example, see Barry D. Van Veen and Kevin M. Buckley, "Beamforming: a versatile approach to spatial filtering", IEEE ASSP magazine, April 1988, and James G Ryan. "Near-field beamforming using microphone arrays", PhD thesis, Carleton University, November 1999.

One classical formulation of beamformer design is the Minimum-Variance formulation. In this approach, for each frequency v of interest, the frequency-domain beamformer may be expressed as a complex weight vector $W(v)$ of length M (where M is the number of microphones used). The response of the beamformer to a signal S at the frequency v is then written as $$BF(S,v) = W^H(v)S(v),$$

where $W^H(v)$ denotes the Hermitian transpose (or complex conjugate transpose) of $W(v)$.

The Minimum-Variance-Distortionless-Response (MVDR) formulation of the optimization problem is as follows:

$$\operatorname*{Min}_{W}(W^H(v)R(v)W(v))$$

subject to the constraint $W^H(v)S(v)=1$ where $R(v)$ is the noise correlation matrix. This optimization problem has the following explicit solution:

$$(\text{MVDR}\_1) \quad W(v) = \frac{R^{-1}(v)S(v)}{S^H(v)R^{-1}(v)S(v)}$$

In terms of an efficient time-domain implementation of the beamformer, a FIR filter can be designed to approximate the frequency response of the beamformer weights for each microphone, as explained in James G Ryan. "Near-field beamforming using microphone arrays". PhD thesis, Carleton University, November 1999, referred to above.

There is one linear constraint in the MVDR formulation: $W^H(v)S(v)=1$ that guarantees distortionless response.

In the case of several linear constraints, the constraints may be written as $$W^H(v)C(v)=G(v),$$

where C(v) is the constraint matrix (size M by K where K<M is the number of constraints) and G(v) is the constraint response vector (row vector of size K). The explicit solution is then given by the following formula:

$$(MVDR\_2)\ W(v)=R^{-1}(v)C(v)[C^H(v)R^{-1}(v)C(v)]^{-1}G^H(v)$$

The above-described approach can be used to ensure a "null" response in a certain direction (for example a direction of interference). It can also be applied to the problem set forth above by equalizing the response of the beamformers to the loudspeaker signal. For that, one can constrain the response of each of J beamformers to be equal to a given arbitrary value "g", chosen a-priori.

Letting $S_j(v)$, $1 \leq j \leq J$ be the "look direction" in connection with which the j'th beamformer is to give distortionless response, and $\tilde{S}(v)$ be the loudspeaker signal, then, for each individual beamformer weights vector $W_j(v)$, the constraints may be written as:

$$W_j^H(v)C_j(v)=G_j(v),$$

where $$C_j(v)=[S_j(v)\ \tilde{S}(v)]$$

is the constraint matrix (M rows and 2 columns) and $$G_j(v)=[1\ g]$$

is the constraint response vector. The solution, for each "sector" j, is then given by formula (MVDR_2).

The main drawback of this design method is that the resulting beamformers are highly dependent on the arbitrary choice of the complex coupling response value (g). The choice of the magnitude and/or phase of this value may impose unnecessary stress on the solution of the optimization problem, resulting in a loss of directivity. To address this issue, an iterative procedure can be used to find, for each frequency, the coupling response value, g, such that optimal beamformers are obtained by (MVDR_2). One example of criterion that can be used for the optimization problem is the cumulated Minimum Variance criterion:

$$F(g, v) = \sum_{j=1}^{J} W_j^H(g, v) R_j(v) W_j(g, v)$$

Such an iterative procedure, however, is computationally expensive and is prone to precision problems associated to the optimization procedure used to find the optimum.

SUMMARY OF THE INVENTION

According to the present invention, a method of designing a beamformer is provided where no such arbitrary choice has to be made to achieve the uniform speakerphone response condition, and which results in optimal beamforming directivity (for the criterion above) under this uniform constraint.

The key unique technical aspect of the present invention is in constraining the finite number of beamformers to have the same response to a loudspeaker signal (as well as the same gain in their respective look directions) without specifying the exact value of their response to this signal. This results in beamformer weights that are optimal in the Minimum Variance sense and satisfy the "uniform coupling" constraint.

This technical aspect of the invention is achieved by re-defining the superdirective optimization problem as an optimization problem on the whole set of beamformers. The "minimum variance" condition combines all beamformer weights at once, and the uniform coupling constraint is expressed as a finite number of linear constraints on the weights of the individual beamformers, without specifying an arbitrary, a priori value for the actual value of the uniform response.

The present invention relies on the recognition that for each sector, the response of the beamformer to the loudspeaker signal can be expressed in the frequency domain as a linear function of the beamformer weights. This allows the uniform coupling to be expressed as a finite number of linear constraints on the weights of a "combined beamformer", which ensures that the resulting constrained optimization problem has a unique, explicit solution.

DETAILED DESCRIPTION OF THE PREFERRED EMBODIMENTS

Figure 1:
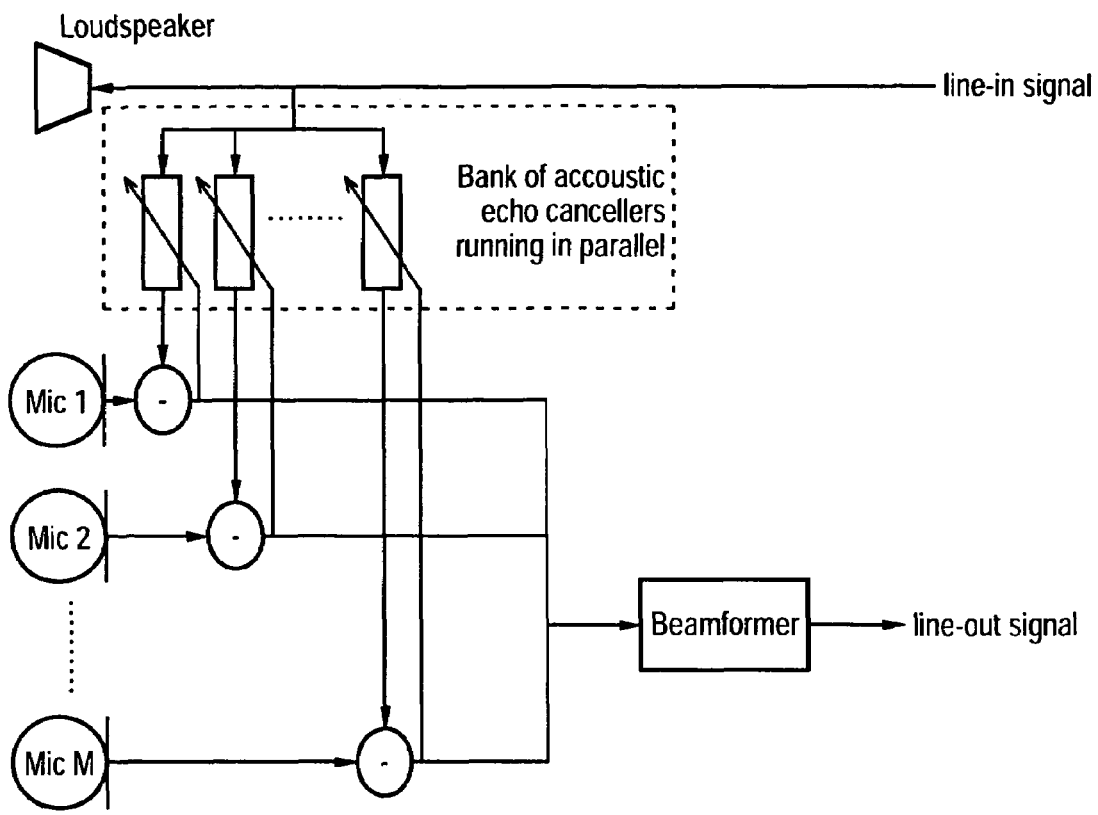
FIG. 1 is a block diagram of a prior art microphone array with acoustic echo cancellation on all of the microphone signals.
Figure 2:
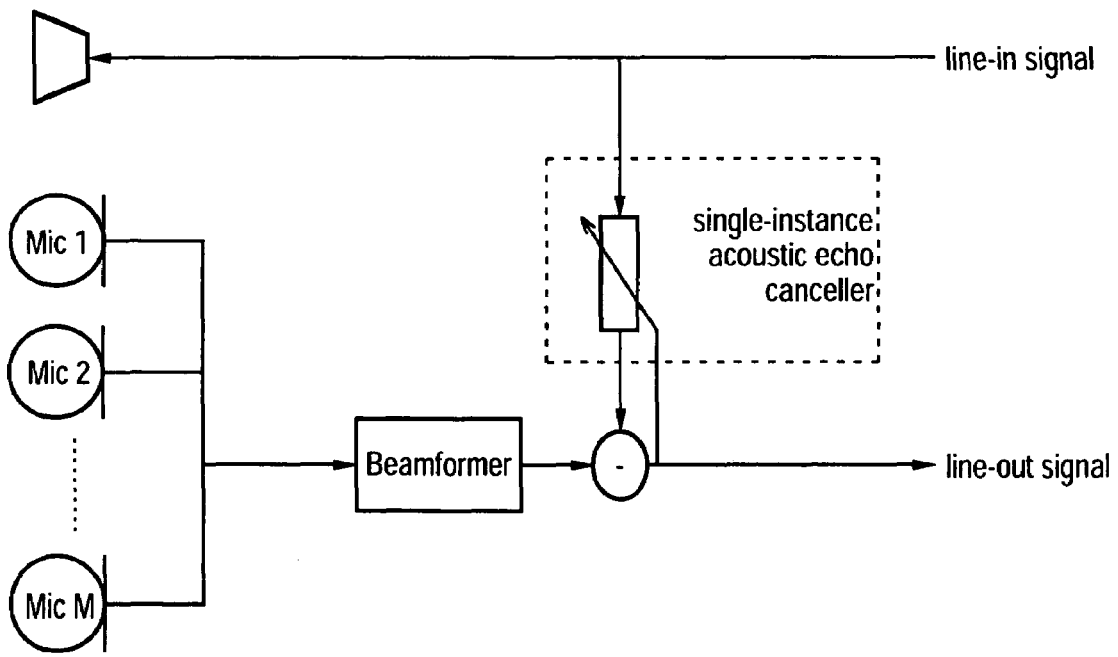
FIG. 2 is a block diagram of a prior art microphone array with acoustic echo cancellation on only the directional signal output from the beamformer.

FIG. 1 shows one prior art approach to acoustic echo cancellation employing a bank of echo cancellers running in parallel on all of the microphone signals. As discussed above, this approach is computationally intensive. A second prior art approach is shown in FIG. 2, whereby acoustic echo cancellation is performed on the spatially filtered signal at the output of the beamformer (i.e. the output signal of the particular microphone facing the "look direction" at any given point in time).

If W(v) represents the concatenated array of size N=M×J of all beamformers weights introduced above; that is, $$W(v) = \begin{bmatrix} W_1(v) \\ W_2(v) \\ \ldots \\ W_J(v) \end{bmatrix}$$

then the distortionless constraints may be expressed as $$W^H(v)C_d(v)=G_d(v),$$

where $C_d(v)$ is the combined distortionless constraint matrix (N=M×J rows and J columns):

$$C_d(v) = \begin{bmatrix} S_1(v) & 0 & 0 & 0 \\ 0 & S_2(v) & 0 & 0 \\ 0 & 0 & \ldots & 0 \\ 0 & 0 & 0 & S_J(v) \end{bmatrix}$$

and $G_d(v)$ is the combined distortionless gain vector (row vector of size J):
$G_d(v)=[1 \ldots 1]$.

The uniform coupling constraints may be expressed as (J−1) linear constraints with the coefficients of the combined beamformer weights array, as follows:

$$\begin{cases} (W_1^H(v) - W_2^H(v))\tilde{S}(v) = 0 \\ (W_2^H(v) - W_3^H(v))\tilde{S}(v) = 0 \\ \ldots \\ (W_{J-1}^H(v) - W_J^H(v))\tilde{S}(v) = 0 \end{cases}$$

These are then combined with the distortionless constraints in the following general constraint:
$$W^H(v)C(v)=G(v)$$

where $C(v)$ is the combined constraint matrix (N=M×J rows and 2J−1 columns):

$$C(v) = \begin{bmatrix} S_1(v) & 0 & \ldots & 0 & \tilde{S}(v) & 0 & \ldots & 0 \\ 0 & S_2(v) & & & -\tilde{S}(v) & \tilde{S}(v) & & \\ & & \ldots & & 0 & -\tilde{S}(v) & \ldots & \\ \ldots & & & \ldots & & 0 & 0 & \\ & & 0 & 0 & & & \ldots & 0 & \tilde{S}(v) \\ 0 & \ldots & 0 & S_J(v) & 0 & & \ldots & 0 & -\tilde{S}(v) \end{bmatrix}$$

and $G(v)$ is the combined gain vector (row vector of size 2J−1):
$G(v)=[1 \ldots 0 \ldots 0]$.

The total variance estimator can also be combined as the summation of individual variance estimators:
$$W^H(v)R(v)W(v)$$

where $R(v)$ is the combined noise correlation matrix (size N by N where N=M×J):

$$R(v) = \begin{bmatrix} R_1(v) & 0 & \ldots & 0 \\ 0 & R_2(v) & & \ldots \\ \ldots & & \ldots & 0 \\ 0 & \ldots & 0 & R_J(v) \end{bmatrix}.$$

The combined optimization problem then becomes $$\min_W(W^H(v)R(v)W(v))$$

subject to the constraint $W^H(v)C(v)=G(v)$ and its solution is given by (MVDR_2): $W(v)=R^{-1}(v)C(v)[C^H(v)R^{-1}(v)C(v)]^{-1}G^H(v)$ The resulting individual beamformers then satisfy the uniform coupling constraint and are optimal in the minimum variance sense given above, since $$W^H(v)R(v)W(v) = \sum_{j=1}^{J} W_j^H(v)R_j(v)W_j(v).$$

Figure 3:
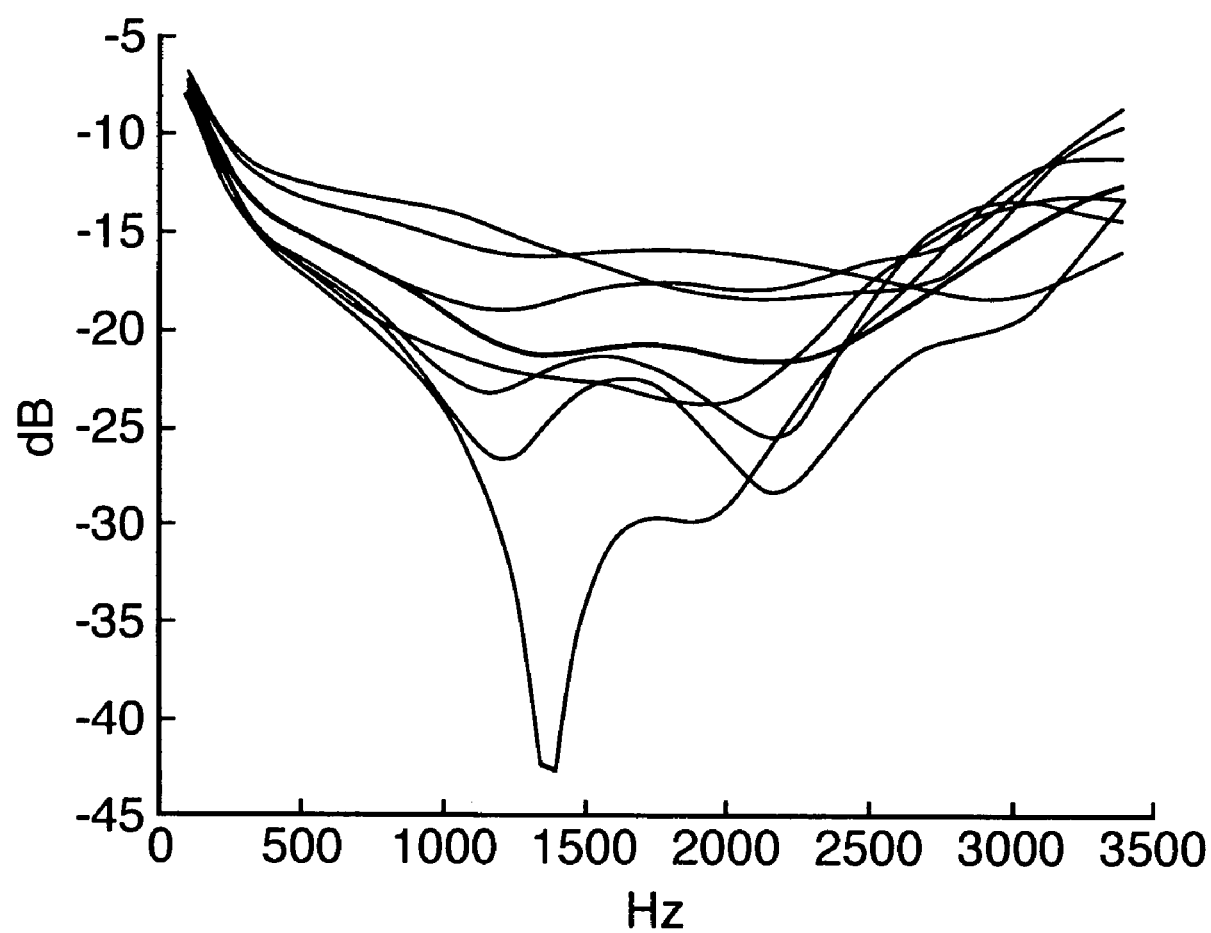
FIG. 3 illustrates loudspeaker coupling equalization of a microphone array designed according to the method of the present invention.
Figure 4:
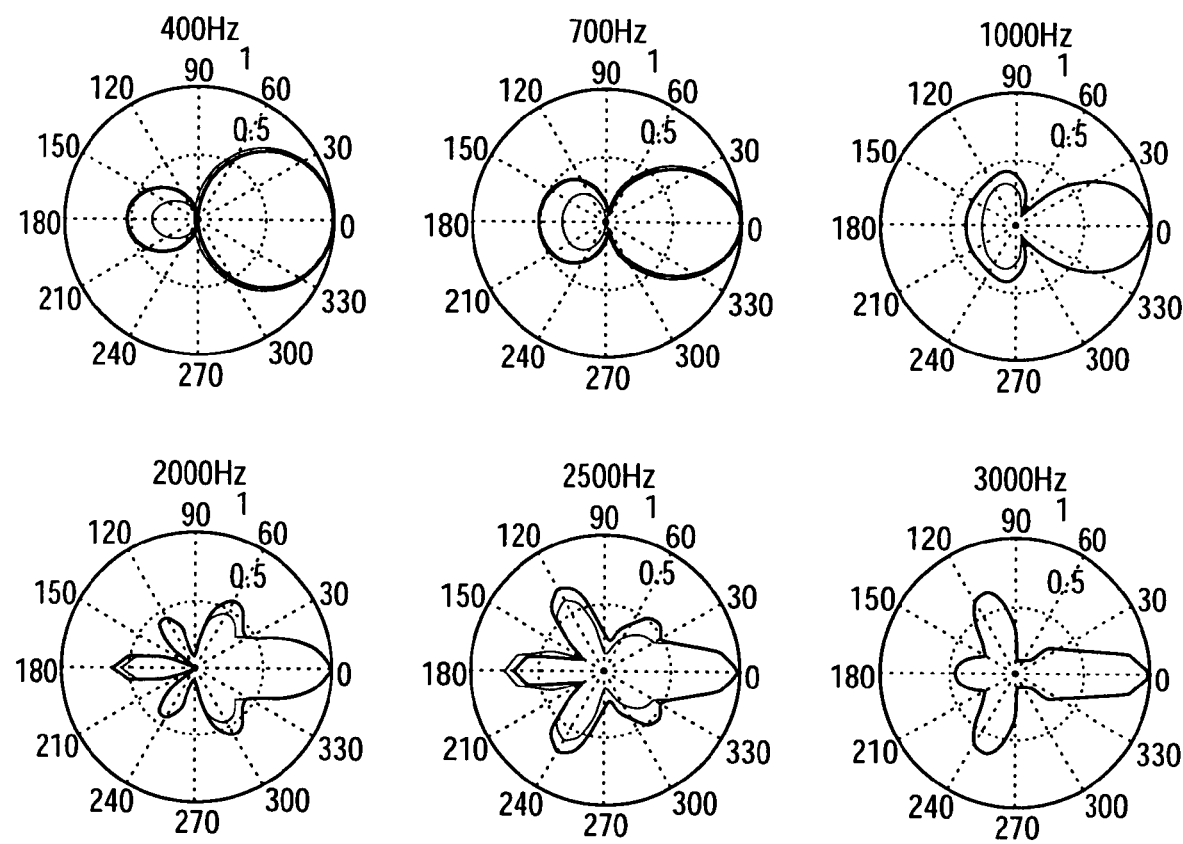
FIG. 4 shows, for a particular embodiment, the effect of coupling equalization according to the inventive method on directivity of a beamformer.

FIG. 3 illustrates the loudspeaker coupling equalization obtained according to the method of the present invention for a microphone array having 6 microphones and 12 sectors. The thick line represents the equalized coupling response (that is the same for all 12 beams), whereas the thin lines represent the responses of the MVDR beamformers before coupling equalization. FIG. 4 shows, for this particular example, the effect of coupling equalization with the inventive method on the directivity of the beamformers. Only one of the 12 beamformers is shown, at different frequencies.

Figure 5:
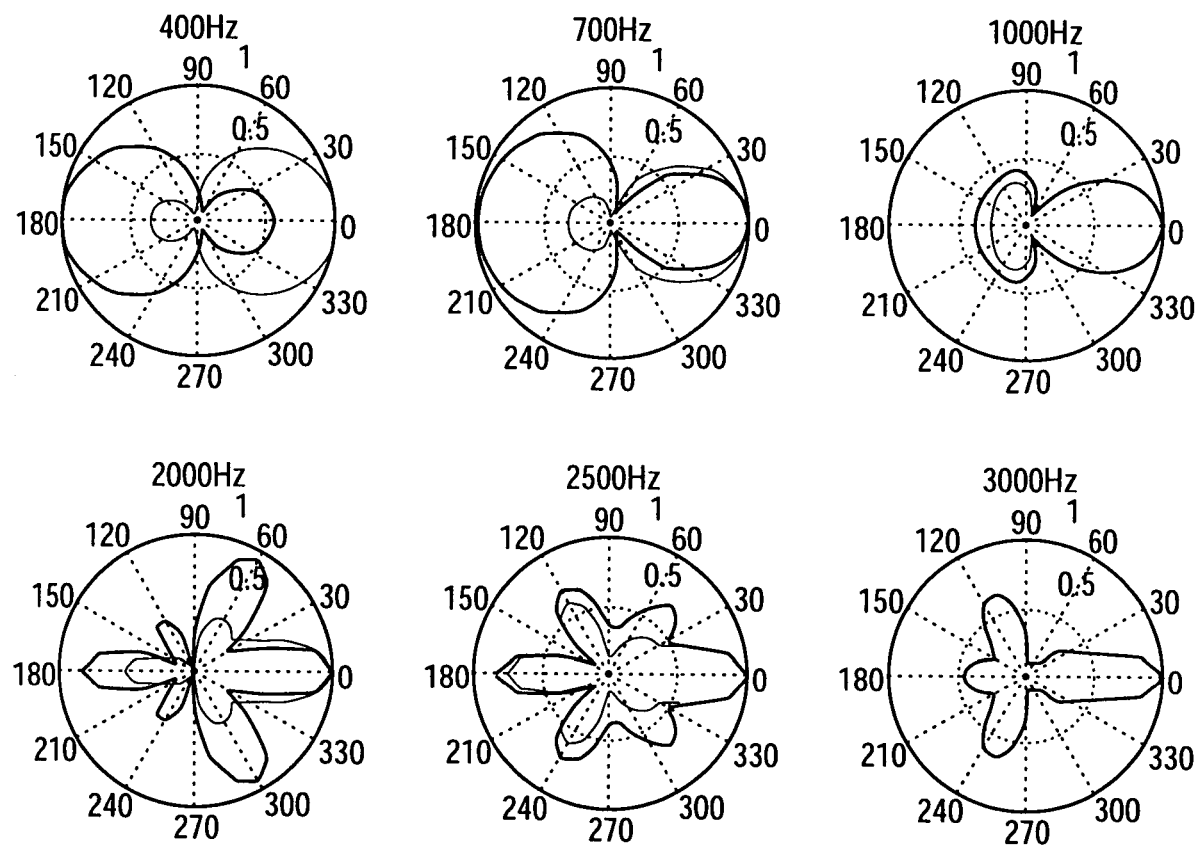
FIG. 5 illustrates the effect on the directivity of a beamformer with an arbitrary choice of equalization coupling response value according to the method of the present invention.

FIG. 5 illustrates the effect of an arbitrary choice of the equalization coupling response value using the prior art method based on (MVDR-2) with a target coupling value equal, for each frequency, to the magnitude of the coupling value provided by the equalization process obtained with the inventive method. The beampatterns in FIG. 5 show that the directivity can be strongly affected, although it should be noted that the coupling response value only differs from the optimal one by its phase. If the target coupling response value also differs in magnitude, then further impact can be expected on the directivity.

Alternatives and variations of the invention are possible. For example, the method of the present invention can be applied to solve any problem similar to that discussed herein above where the uniform constraint, that is, the constraint that all the individual beamformers have to satisfy, can be expressed as a linear function of the beamformers' weights.

The many features and advantages of the invention are apparent from the detailed specification and, thus, it is intended by the appended claims to cover all such features and advantages of the invention that fall within the sphere and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. In an audio conferencing system having a loudspeaker for outputting and a plurality of M microphones for inputting their respective signals, a combined beamformer comprising a plurality of J individual beamformers for modifying the gain of each of said signals by respective beamformer weight vectors of length M, Wj(v), where j=1 to J, to simultaneously create respective beams each pointing in a different look direction, said combined beamformer having a common response to said loudspeaker signal without having to specify an exact value of said (a) response and being characterized by a minimum variance condition that combines all of said beamformer weight vectors simultaneously as $$\operatorname*{Min}_{W}(W^H(v)R(v)W(v))$$

subject to the constraint $W^H(v)C(v)=G(v)$
where $W_j(v)$ is the vector of length M×J formed of concatenated vectors Wj(v), $W^H(v)$ denotes the Hermitian transpose of W(v), R(v) is a concatenated noise correlation matrix of size M×J by M×J, C(v) is a uniform coupling constraint matrix expressed as a number involving more than one beamformer of linear constraints on the components of the concatenated weights vector, W(v) and G(v) is a constraint response vector, a unique solution to said minimum variance condition being given by $$W(v)=R^{-1}(v)C(v)[C^H(v)R^{-1}(v)C(v)]^{-1}G^H(v)$$

such that individual ones of said beamformers satisfy said uniform coupling constraint and is expressed as a linear function of the combined weight vectors of said beamformers and are optimal in terms of said minimum variance condition.

2. A method of making a combined beamformer for use in an audio conferencing system having a loudspeaker for outputting and a plurality of M microphones for inputting their respective signals, said combined beamformer having a common response to said loudspeaker signal without having to specify an exact value of said (a) response, said method comprising providing a plurality of J individual beamformers for modifying the gain of each of said signals by respective beamformer weight vectors of length M, Wj(v), where j=1 to J, to simultaneously create respective beams each pointing in a different look direction and having the same (a similar) gain, subjecting said combined beamformer to a minimum variance condition that combines all of said beamformer weight vectors simultaneously as $$\operatorname*{Min}_{W}(W^H(v)R(v)W(v))$$

subject to the constraint $W^H(v)C(v)=G(v)$
where W(v) is the vector of length M×J formed of concatenated vectors Wj(v), $W^H(v)$ denotes the Hermitian transpose of W(v), R(v) is a concatenated noise correlation matrix of size M×J by M×J, C(v) is a uniform coupling constraint matrix expressed as a number involving more than one beamformer of linear constraints on the components of the concatenated weights vector W(v) and G(v) is a constraint response vector, and providing a unique solution to said minimum variance condition, said solution being $$W(v)=R^{-1}(v)C(v)[C^H(v)R^{-1}(v)C(v)]^{-1}G^H(v)$$

such that individual ones of said beamformers satisfy said uniform coupling constraint and is expressed as a linear function of the combined weight vectors of said beamformers and are optimal in terms of said minimum variance condition.

* * * * *